(12) United States Patent  
Speer

(10) Patent No.: US 8,910,902 B2  
(45) Date of Patent: Dec. 16, 2014

(54) TOWED SENSOR ARRAY MANEUVERING SYSTEM AND METHODS

(75) Inventor: Thomas E. Speer, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 13/229,770

(22) Filed: Sep. 12, 2011

(65) Prior Publication Data

US 2013/0062464 A1    Mar. 14, 2013

(51) Int. Cl.
*B64D 3/00* (2006.01)
*B64D 3/02* (2006.01)

(52) U.S. Cl.
CPC ... *B64D 3/00* (2013.01); *B64D 3/02* (2013.01)
USPC ........................................................ 244/1 TD

(58) Field of Classification Search
USPC .................................................. 244/1 TD, 3
See application file for complete search history.

(56) References Cited

U.S. PATENT DOCUMENTS

| | | | |
|---|---|---|---|
| 2,440,737 A * | 5/1948 | Cawein | 343/707 |
| 4,014,481 A * | 3/1977 | Daikeler et al. | 244/3 |
| 4,195,694 A | 4/1980 | Gizzarelli, Sr. | |
| 4,598,882 A | 7/1986 | Opdahl | |
| 5,188,313 A * | 2/1993 | Piasecki | 244/3 |
| 5,231,480 A * | 7/1993 | Ulich | 348/31 |
| 6,199,793 B1 * | 3/2001 | Hainsworth et al. | 244/1 TD |
| 6,422,506 B1 * | 7/2002 | Colby | 244/1 TD |
| 6,591,169 B2 * | 7/2003 | Jones et al. | 701/4 |
| 6,683,555 B2 * | 1/2004 | Carlson et al. | 342/14 |
| 6,711,476 B2 | 3/2004 | Jones et al. | |
| 6,765,383 B1 * | 7/2004 | Barringer | 324/330 |
| 6,845,936 B1 * | 1/2005 | Mouge et al. | 244/1 TD |
| 7,100,867 B2 * | 9/2006 | Houck, II | 244/34 A |
| 7,424,350 B2 | 9/2008 | Speer | |
| 7,548,800 B2 | 6/2009 | Jones et al. | |
| 2002/0190162 A1 * | 12/2002 | McDonnell | 244/170 |
| 2004/0141170 A1 * | 7/2004 | Jamieson et al. | 356/5.01 |

FOREIGN PATENT DOCUMENTS

JP           2000292097 A     10/2000

OTHER PUBLICATIONS

Combined Search and Examination Report, GB1216310.1, Dec. 28, 2012.

* cited by examiner

*Primary Examiner* — Isam Alsomiri
*Assistant Examiner* — Justin Benedik
(74) *Attorney, Agent, or Firm* — Ameh IP; Elahe Toosi; Lowell Campbell

(57) ABSTRACT

A towed sensor array maneuvering system and methods are disclosed. A towed airborne vehicle comprising a sensor array is actively maneuvered via a plurality of surfaces coupled thereto. The surfaces are controlled such that a desired path is tracked based on and as a function of desired tracking parameters.

20 Claims, 10 Drawing Sheets

TOWED SENSOR ARRAY MANEUVERING SYSTEM AND METHODS

FIELD

Embodiments of the present disclosure relate generally to methods and systems for airborne vehicles and, more particularly, embodiments of the present disclosure relate to airborne towed vehicles.

BACKGROUND

Remote sensing acquires information about an object or a place without making physical contact with the object or the place. Aerial sensor technologies are generally used to detect and classify objects on a surface (e.g. of the earth), in the atmosphere, and in water by means of propagated signals such as electromagnetic signals emitted from aircraft or satellites. Remote sensing is generally done via passive or active remote sensing. Passive sensors detect natural radiation such as sunlight that is emitted or reflected by the object or the place being observed. Active collection emits a signal that is reflected or backscattered from the object or the place, and detected by a sensor. A time delay between emission and return of the signal may be measured to determine a location, height, speed and direction of an object. Examples of remote sensors include film photography, infrared, charge-coupled devices, radiometers, RADAR and light detection and ranging (LiDAR).

Remote sensing allows collection of data in dangerous or inaccessible areas, and can replace costly or slow ground data collection, while ensuring that objects or places are not disturbed. Remote sensing applications may comprise applications such as monitoring deforestation, vegetation rates, erosion, pollution, forestry, weather, land use, measuring sea ice, depth sounding in water, collection of data about dangerous areas, natural resource management, land usage and conservation, stand-off collection on border areas, city planning, archaeological investigations, military observation, geomorphological surveying, and other remote sensing applications.

SUMMARY

A towed sensor array maneuvering system and methods are disclosed. A towed airborne vehicle comprising a sensor array is actively maneuvered via a plurality of aerodynamic surfaces coupled to the towed airborne vehicle. The aerodynamic surfaces are controlled such that a desired path is tracked based on and as a function of desired tracking parameters.

In this manner, a vehicle comprising a sensor array can be towed by, for example, a helicopter to follow a road. The vehicle maneuvers, for example, by using direct lift and side forces from aerodynamic surfaces to maintain an orientation of the sensor array and a constant altitude above the road. Because of large side force requirements, the vehicle has extensive vertical surfaces as well as horizontal wings. An aerodynamic configuration and an ability to aggressively maneuver while being towed by the helicopter allows the vehicle to accurately track the desired path on the road.

In an embodiment, a towed sensor array maneuvering system comprises a towed airborne vehicle, a sensor array, and a plurality of aerodynamic surfaces. The towed airborne vehicle is operable to be pulled by a towing airborne vehicle and is operable to track a desired path. The sensor array is coupled to the towed airborne vehicle and is operable to receive sensed signals from the desired path. The aerodynamic surfaces are coupled to the towed airborne vehicle and are operable to actively maneuver the towed airborne vehicle such that the desired path is tracked based on and as a function of desired tracking parameters.

In another embodiment, a method for maneuvering a towed sensor array actively maneuvers a towed airborne vehicle comprising a sensor array via surfaces coupled thereto. The method further controls the surfaces such that a desired path is tracked based on and as a function of desired tracking parameters.

In yet another embodiment, a method for providing a towed airborne vehicle provides a towed airborne vehicle operable to be pulled by a towing airborne vehicle and operable to track a desired path. The method further provides a sensor array coupled to the towed airborne vehicle and operable to receive sensed signals from the desired path. The method further provides a plurality of aerodynamic surfaces coupled to the towed airborne vehicle and operable to actively maneuver the towed airborne vehicle such that the desired path is tracked based on and as a function of desired tracking parameters.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
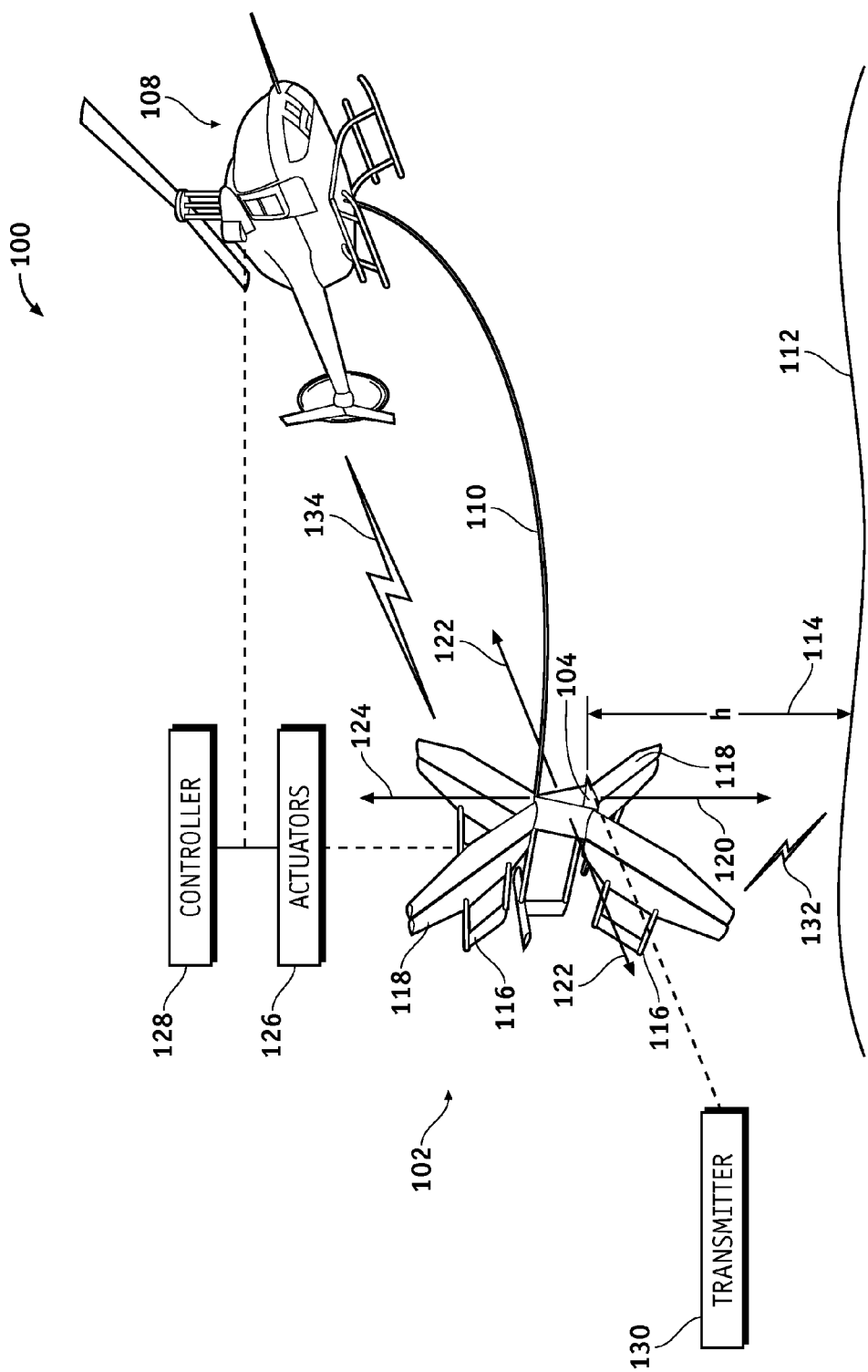
FIG. 1 is an illustration of an exemplary schematic operational environment of a towed airborne vehicle according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to control laws, control systems, sensor tracking techniques, inertial measurement sensors, optical sensors, vibration sensors, other sensors, data transmission, signaling, network control, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, a helicopter-towed vehicle along a winding road. Embodiments of the disclosure, however, are not limited to such helicopter application, and the techniques described herein may also be utilized in other applications. For example but without limitation, embodiments may be applicable to ground, air, near space, water and underwater towed vehicles, and the like, maneuvering along a route or path.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Passive vehicles such as towed-targets, minesweepers and gliders may be towed behind a helicopter; however, the helicopter may be incapable of following a particular road with sufficient precision at a desired speed. Since passive vehicles do not actively maneuver while towed by the helicopter, passive vehicles may not meet tracking requirements desired for following the particular road precisely at the desired speed. For example, while towed by the helicopter and sweeping along a winding road, passive vehicles may easily overshoot a turn.

In contrast, embodiments of the disclosure provide a towed airborne vehicle comprising aerodynamic surfaces configured to provide active control for meeting the tracking requirements, and add additional control and flight dynamics. In this manner, the towed airborne vehicle can, for example, maneuver side-to-side while towed by an aircraft and sweeping along a winding road at a constant altitude above the winding road and with a towed vehicle payload pointing substantially straight down.

FIG. 1 is an illustration of an exemplary schematic operational environment 100 of a towed airborne vehicle 102 according to an embodiment of the disclosure. As shown in FIG. 1, the towed airborne vehicle 102 comprising a sensor array 104 is pulled via a tow cable 110 by a helicopter 108 to follow a path 112. The towed airborne vehicle 102 maneuvers, for example, by using direct lift and side forces 122 from the horizontal aerodynamic surfaces 118 so as to maintain an orientation of the sensor array 104 and a constant altitude h 114 above the path 112. In operation, the tow cable 110 would be coming into the towed airborne vehicle 102 from ahead, while the direct side forces 122 would be pointing to the left and right. The tow cable 110 and side forces 122 may be at substantially right angles to each other.

In operation, the towed airborne vehicle 102 may be monitored by an operator in the helicopter 108. Data from the sensor array 104 are received though a communication link 512 (FIG. 5) of the tow cable 110 and can be displayed to the operator at an operator station (540 in FIG. 5) in the helicopter 108. The operator can control the path 112 of the towed airborne vehicle 508. Inertial sensors 538/542 (FIG. 5) are used to coordinate a motion of the towed airborne vehicle 508 relative to the towing airborne vehicle 502.

Because of one or more large side force requirements, the towed airborne vehicle 102 has extensive vertical and horizontal aerodynamic surfaces 118 that may be controlled by tails 116. Coordinated use of the aerodynamic surfaces 118 allow the towed airborne vehicle 102 to assume an aerodynamic configuration operable to aggressively maneuver while being towed by the helicopter 108 and meeting tracking requirements. For example, the towed airborne vehicle 102 can maneuver side-to-side while towed by the helicopter 108 and sweep along the path 112 such as, but without limitation, a winding road, and the like at a constant altitude h 114 above the path 112, and with the towed airborne vehicle 102 payload 120 pointing substantially straight down.

The sensor array 104 may receive sensed signals 132 from the path 112. The sensed signals 132 may comprise, for example but without limitation, passively received signals from the path 112 (e.g., natural radiation such as sunlight), signal reflections from signals emitted from the sensor array 104, signals received from ground based transmitters (e.g., charge-coupled devices, and radiometers) on the path 112, and the like.

The sensed signals 132 may comprise data indicating, for example but without limitation, deforestation, glacial features, depth, features of a border area, and the like. The sensed signals 132 may be transmitted by a transmitter 130 to a second receiver (not shown) for further monitoring and/or information processing. For example, the sensor array 104 transmits the sensed signals 132 from the transmitter 130 to a second receiver located at the helicopter 108. The sensed signals 132 may be transmitted through the communication link 512 (FIG. 5) of the tow cable 110, and/or through a wireless communication link 134.

Alternatively, the second receiver, may be located, for example but without limitation, locally in a controller 526 (FIG. 5) of the towed airborne vehicle 102, in a remote location such as: a satellite, a base station, a desktop, a laptop or notebook computer, a hand-held computing device (PDA, cell phone, palmtop, etc.), a mainframe, a server, a client, or any other type of special or general purpose computing device as may be desirable or appropriate for a given application or environment.

The embodiments provide adequate control authority and control bandwidth to meet the tracking requirements, good operator handling characteristics to allow proper tracking from a remote operator, and mitigating any coupled dynamic interaction effects between the towed airborne vehicle 102 and the helicopter 108. A magnitude of these challenges are a function of the tracking requirements, towed airborne vehicle 102 airspeed, weight of the towed airborne vehicle 102 and the tow cable 110, rates of the actuators 126, and latencies of the controller 128.

Figure 2:
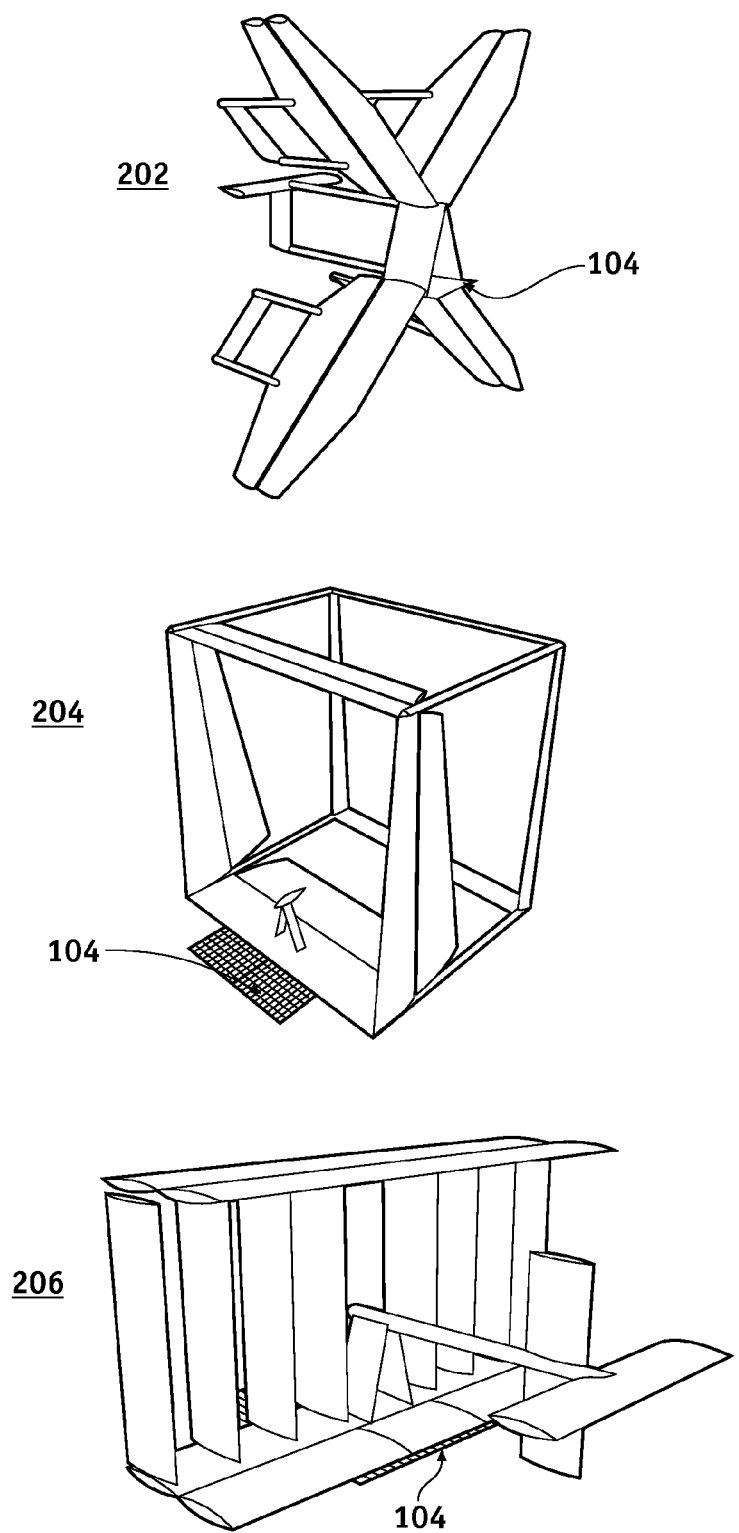
FIG. 2 is an illustration of various exemplary towed airborne vehicles according to various embodiments of the disclosure.

FIG. 2 is an illustration of various embodiments of the towed airborne vehicle 102 according to various embodiments of the disclosure. FIG. 2 shows an X-wing configuration 202, a box-wing configuration 204, and a bi-plane configuration 206, as explained in more detail below.

Figure 3:
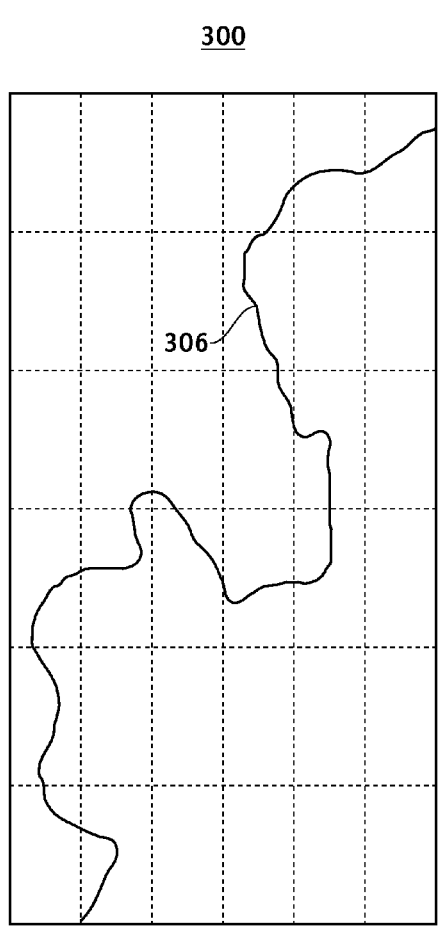
FIG. 3 is an illustration of an exemplary graph showing a course followed by a towed airborne vehicle comprising a sensor array according to an embodiment of the disclosure.

FIG. 3 is an illustration of a graph 300 showing a course 306 followed by the towed airborne vehicle 102 comprising the sensor array 104 according to an embodiment of the disclosure.

Figure 4:
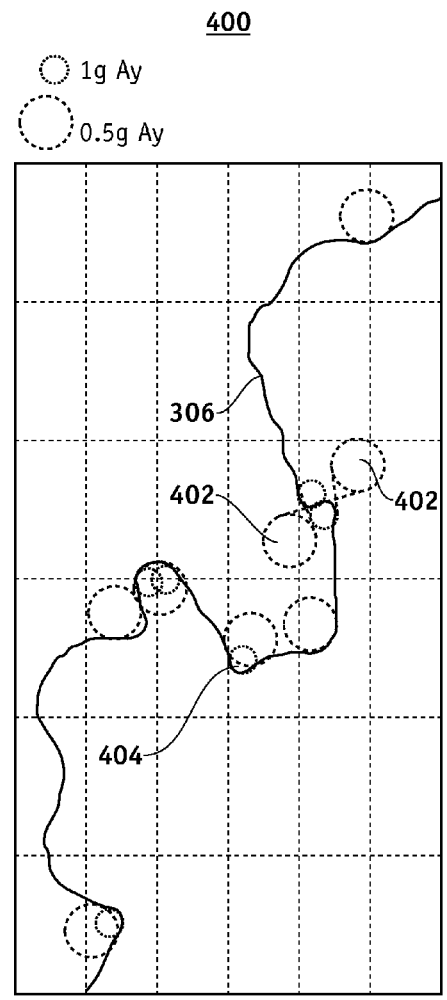
FIG. 4 is an illustration of an exemplary graph showing towing vehicle maneuverability vs. the course of FIG. 3 according to an embodiment of the disclosure.

FIG. 4 is an illustration of an exemplary graph 400 showing towing vehicle's (e.g., helicopter 108) maneuverability vs. the course 306 of FIG. 3 according to an embodiment of the disclosure. The maneuvering requirements for the towed airborne vehicle 102 are determined by computing accelerations needed to track the course 306, the horizontal distance along the course 306, direction of travel, and elevation angle.

For example but without limitation, the helicopter 108 may have a limitation of about 0.5 g lateral acceleration (Ay) (27° bank) resulting in a turning radius illustrated by circles 402 overlaid on FIG. 4, which does not enable the helicopter 108 to follow the course 306 with sufficient precision to maintain the sensor array 104 over the course 306. The towed airborne vehicle 102 with a 1 g lateral acceleration (Ay) resulting in a smaller turning radius illustrated with circles 404 would be able to track the course 306 with higher precision.

Figure 5:
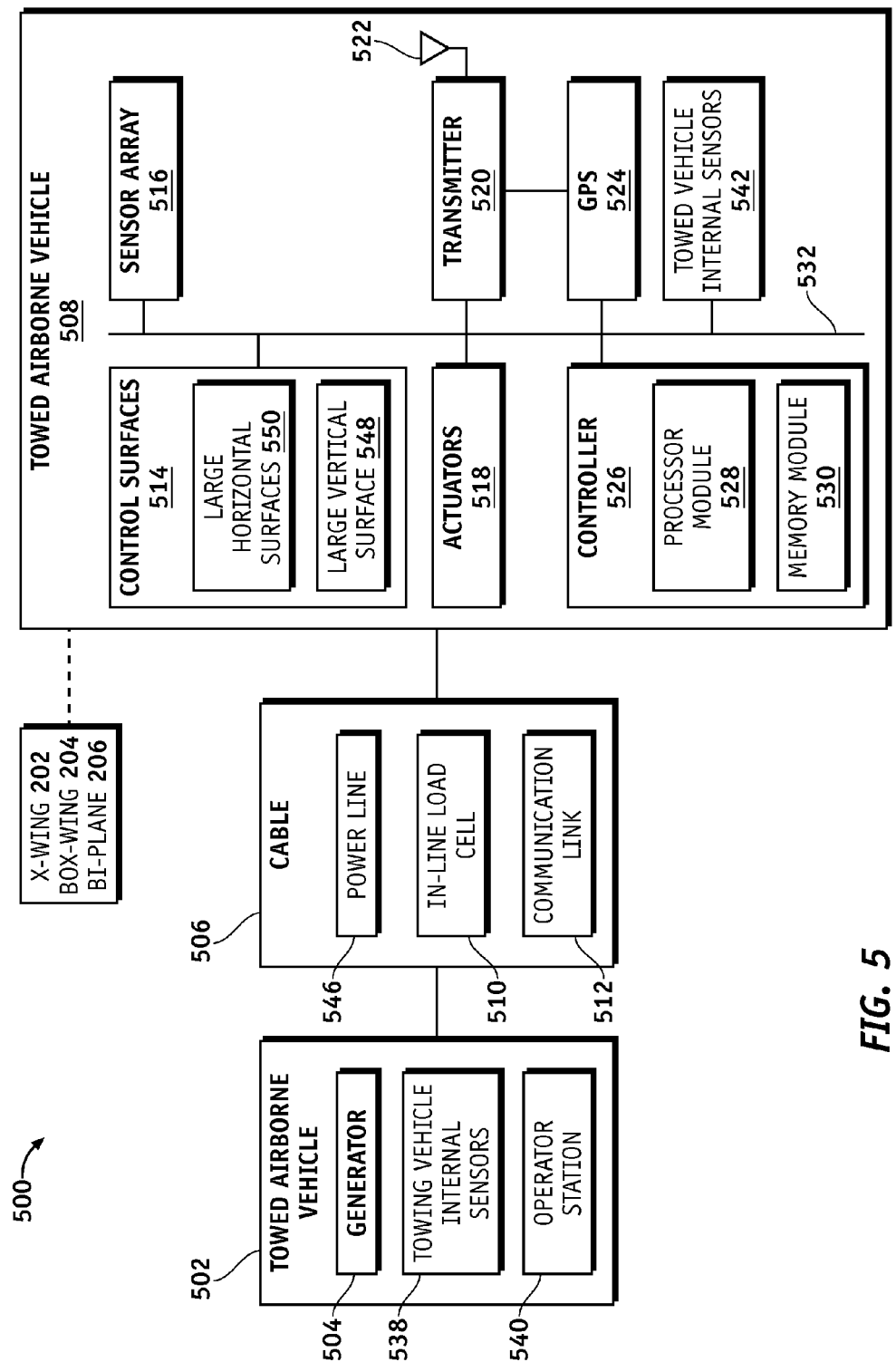
FIG. 5 is an illustration of an exemplary functional block diagram of a system for towing an airborne vehicle according to an embodiment of the disclosure.

FIG. 5 is an illustration of an exemplary functional block diagram of a system 500 suitable for towing an airborne vehicle according to an embodiment of the disclosure. The various illustrative blocks, modules, processing logic, and circuits described in connection with system 500 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The system 500 comprises a towing airborne vehicle 502 (108 in FIG. 1), a towed airborne vehicle 508 (102 in FIG. 1), a tow cable 506 (110 in FIG. 1).

The towing airborne vehicle 502 is configured to be coupled to the tow cable 506 and is configured to pull the towed airborne vehicle 508. The towing airborne vehicle 502 maneuverability may be, for example but without limitation, about 0.1 Hz with about 0.5 g maximum lateral acceleration, or other maneuverability measure. The towing airborne vehicle 502 may be, for example but without limitation, a helicopter as shown in FIG. 1, a manned and unmanned ground, air, space, water vehicles, or other vehicle.

The towing airborne vehicle 502 may comprise a power generator 504 configured to provide power to the towed airborne vehicle 508 via the tow cable 506. The towing airborne vehicle 502 may include an operator station 540 to monitor and control the towed airborne vehicle 508 via the communication link 512 of the tow cable 506.

The tow cable 506 is configured to be removably coupled to the towing airborne vehicle 502 and may be operable to engage with a winch cable. Construction of the tow cable 506, comprising a bundle of power, signal, and strength elements is similar to cables used for remotely operated oceanographic vehicles. The tow cable 506 may comprise a power line 546, an in-line load cell 510, and the communication link 512.

The power line 546 is configured to transmit power from the power generator 504 to the towed airborne vehicle 508. The sensor array 516 and towed airborne vehicle 508 may be powered by the towing airborne vehicle 502, through the power line 546 of the tow cable 506.

The in-line load cell 510 is configured to detect a tension load on the tow cable 506.

The communication link 512 is configured to communicate data between the towed airborne vehicle 508 and the towing airborne vehicle 502. The towed airborne vehicle 508 may transmit the sensed sensor signals 132 (FIG. 1) to the towing airborne vehicle 502 through the communication link 512 of the tow cable 506. The towing airborne vehicle 502 sends control signals to the towed airborne vehicle 508 through the communication link 512 of the tow cable 506.

The towed airborne vehicle 508 is configured to be pulled by the towing airborne vehicle 502 to track the desired path 112 (FIG. 1).

In one embodiment, an average lift from the towed airborne vehicle 508 is about 100% of weight of the towed airborne vehicle 102 in order to have adequate maneuverability in the downward direction of the payload 120 (FIG. 1) as well as upwards. The towed airborne vehicle 508 can maneuver about ±20% of the tow cable 506 length in all directions without an undue increase in tension of the tow cable 506 at the towing airborne vehicle 502.

The towed airborne vehicle 508 may be sized by its gross weight. The vertical and horizontal spans and the areas of control surfaces 514 (e.g., the aerodynamic surfaces 118 (FIG. 1)) may be determined by a gross weight of the towed airborne vehicle 508 times a required horizontal and vertical accelerations, divided by a dynamic pressure at operating flight conditions and a maximum lift coefficient corresponding to a cross section of the control surfaces 514.

As mentioned above, in operation, the towed airborne vehicle 508 is monitored by the operator at the operator station 540 in the towing airborne vehicle 502. Data from the sensor array 516 are received via the communication link 512 of the tow cable 506 and displayed to the operator at the operator station 540. The operator can control the path 112 of the towed airborne vehicle 508. Towing vehicle inertial sensors 538 and towed vehicle inertial sensors 542 are used to coordinate the motion of the towed airborne vehicle 508 relative to the towing airborne vehicle 502.

The towed airborne vehicle 508 may be any vehicle, for example but without limitation, a ground vehicle, a hover craft, a surface effect craft, an air vehicle, a balloon, a high altitude vehicle, a near space vehicle, water and underwater vehicles, or other vehicle, that may be towed by the towing airborne vehicle 502 for active maneuvering along any rout or path. The towed airborne vehicle 508, may comprise: control surfaces 514, a sensor array 516, a plurality of actuators 518, a transmitter 520, a Global Positioning System (GPS) 524, the controller 526, and towed vehicle inertial sensors 542. These components may be coupled to and communicate with each other via a network bus 532.

As mentioned above, according to various embodiments of the disclosure, the towed airborne vehicle 508 comprises, for example but without limitation, an X-wing configuration 202, a box-wing configuration 204, a bi-plane configuration 206, or other configuration, as explained in more detail below in the context of discussion of FIGS. 8-13, FIGS. 14-19, and FIGS. 20-27 respectively.

The control surfaces 514 are coupled to the towed airborne vehicle 508 and are configured to actively maneuver the towed airborne vehicle 508 such that the desired path 112 is tracked based on and as a function of desired tracking parameters. The control surfaces 514, may comprise, for example but without limitation, fixed and movable wings, ailerons, flaps, elevators, winglets, spoilers, or other control surfaces. The control surfaces 514 may be moved by means of the actuators 518 to control the path 112 (FIG. 1).

The control surfaces 514 are configured to provide an aerodynamic configuration such that the towed airborne vehicle 508 aggressively maneuvers while the towed airborne vehicle 508 is being towed by the towing airborne vehicle 502. In one embodiment, large vertical aerodynamic surfaces 548 and large horizontal aerodynamic surfaces 550 (118 in FIG. 1) are to accommodate the large side forces 122 (FIG. 1) on the towed airborne vehicle 508.

For example, the control surfaces 514 provide stable lateral maneuverability via using direct lift and large side forces 122 generated therefrom so as to maintain an orientation of the sensor array 516 and a substantially constant altitude h 114 (FIG. 1) above the desired path 112 (FIG. 1). Use of large vertical aerodynamic surfaces 548 enable the towed airborne vehicle 508 to maneuver sideways behind the towing airborne vehicle 502.

As mentioned above, the control surfaces 514 may comprise surfaces such as the large vertical aerodynamic surfaces 548 and the large horizontal aerodynamic surfaces 550 utilizing air in a case of an aircraft. Alternatively, the control surfaces 514 may comprise surfaces such as hydrodynamic surfaces utilizing liquid (e.g., water) instead of air in a case of a water craft. Therefore, in this document, control surfaces, surfaces, fluid dynamic surfaces, and aerodynamic surfaces may be used interchangeably.

The sensor array 516 (104 in FIGS. 1 and 2) is coupled to the towed airborne vehicle 508 and is configured to receive the sensed signals 132 from the (desired) path 112 as mentioned above.

The actuators 518 are coupled to the control surfaces 514 and are configured to allow the control surfaces 514 assume various configuration based on actuation commands received from the controller 526. The actuation commands may be a function of the desired tracking parameters, and/or other parameters, as explained in more detailed below.

The transmitter 520 (130 in FIG. 1) is coupled to the sensor array 516 and is configured to transmit the sensed signals 132 received by the sensor array 516 to the second receiver for further monitoring and information processing as mentioned above.

The GPS 524, the towed vehicle inertial sensors 542, and the towing vehicle inertial sensors 538 are coupled to the sensor array 516 and are configured to detect orientation of the sensor array 516. The GPS 524 communicates a location of the sensor array 516 to the controller 526.

The controller 526 is configured to actively control the control surfaces 514 based on and as a function of the desired tracking parameters. The tracking parameters may comprise, for example but without limitation, an orientation of the sensor array 516, an altitude of the sensor array 516 above the desired path 112, acceleration and angular rates of the towing airborne vehicle 502, acceleration and angular rates of the towed airborne vehicle 508, control surfaces 514 positions to allow proper tracking from a remote operator for mitigating any coupled dynamic interaction effects between the towed airborne vehicle 508 and the towing airborne vehicle 502, a towed vehicle airspeed of the towed airborne vehicle 508, a towed vehicle weight of the towed airborne vehicle 508, a tow cable weight of the tow cable 506, an actuator rate of each of the actuators 518, a system latency of the system 500, or other tracking parameter.

The controller 526 may comprise a processor module 528, and a memory module 530.

The processor module 528 comprises processing logic that is configured to carry out the functions, techniques, and processing tasks associated with the operation of the system 500. In particular, the processing logic is configured to support the system 500 described herein. For example, processor module 528 may provide actuation commands to the actuators 518 to actively control the control surfaces 514 based on as a function of desired tracking parameters. The processor module 528 accesses the desired tracking parameters from the memory module 530 to calculate the actuation commands for adjustments to be made to the control surfaces 514. For another example, the processor module 528, sends the data received by the sensor array 516 to the transmitter 520. In this manner, the processor module 528 accesses data stored in the memory module 530, to support functions of the system 500. Thereby, the processor module 528 enables active control of the towed airborne vehicle 508.

The processor module 528 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 530 may be a data storage area with memory formatted to support the operation of the system 500. The memory module 530 is configured to store, maintain, and provide data as needed to support the functionality of the system 500 in the manner described herein. In practical embodiments, the memory module 530 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 530 may be coupled to the processor module 528 and configured to store, for example but without limitation, the desired tracking parameters, a computer program that is executed by the processor module 528, an operating system, an application program, tentative data used in executing a program, and the like. Additionally, the memory module 530 may represent a dynamically updating database containing a table for updating various databases.

The memory module 530 may be coupled to the processor module 528 such that the processor module 528 can read information from and write information to the memory module 530. As an example, the processor module 528 and memory module 530 may reside in respective application specific integrated circuits (ASICs). The memory module 530 may also be integrated into the processor module 528. In an embodiment, the memory module 530 may comprise a cache memory for storing temporary variables or other intermediate information during execution of instructions to be executed by the processor module 528.

Figure 6:
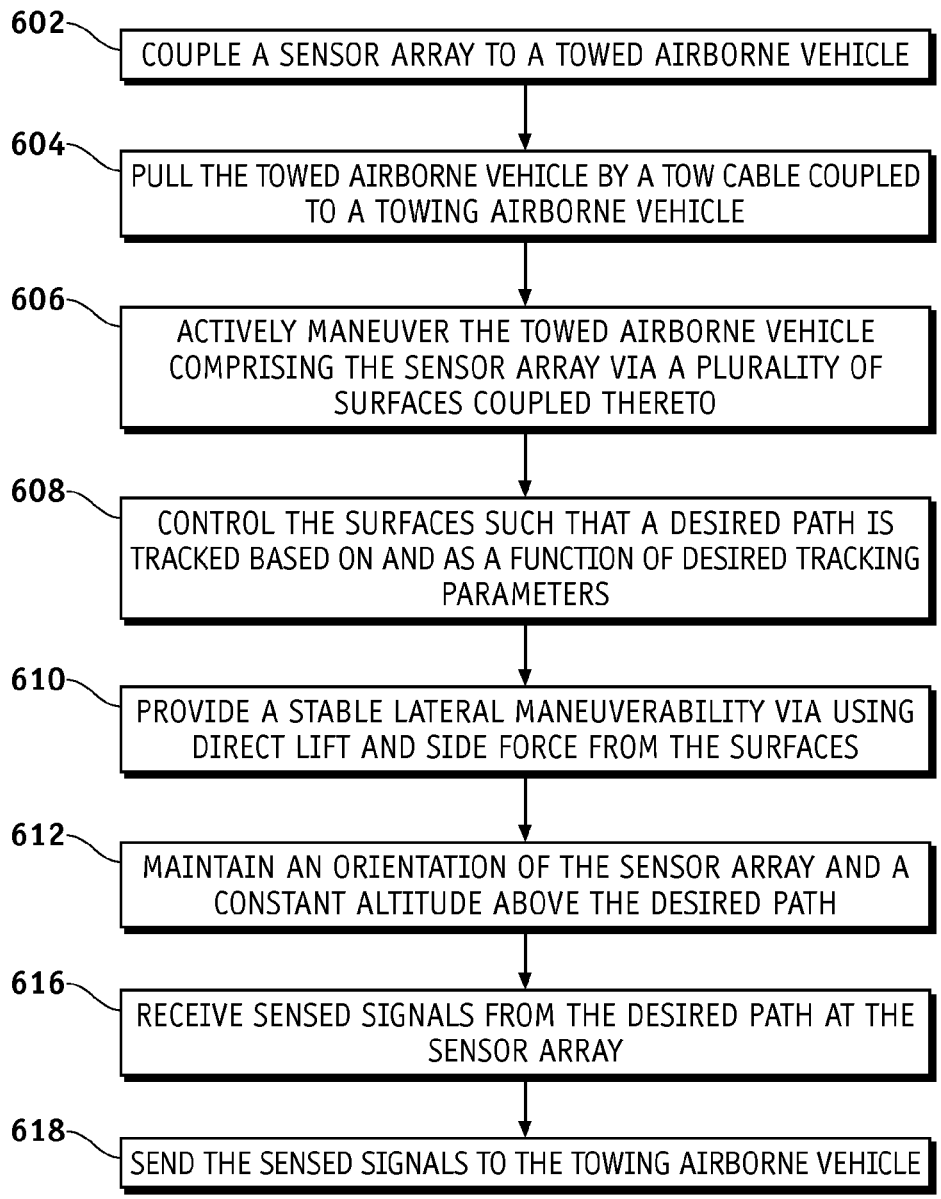
FIG. 6 is an illustration of an exemplary flowchart showing a process for using a towed airborne vehicle comprising a sensor array according to an embodiment of the disclosure.

FIG. 6 is an illustration of an exemplary flowchart showing a process 600 for using the towed airborne vehicle 102/508 comprising the sensor array 104/516 according to an embodiment of the disclosure. The various tasks performed in connection with process 600 may be performed mechanically, by software, hardware, firmware, a computer-readable medium having computer executable instructions for performing the process method, or any combination thereof. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

For illustrative purposes, the following description of process 600 may refer to elements mentioned above in connection with FIGS. 1-5. In practical embodiments, portions of the process 600 may be performed by different elements of the system 500 such as: the towing airborne vehicle 502, the tow cable 506, the towed airborne vehicle 508, etc. Process 600 may have functions, material, and structures that are similar to the embodiments shown in FIGS. 1-5. Therefore common features, functions, and elements may not be redundantly described here.

Process 600 may begin by coupling a sensor array such as the sensor array 516 to a towed airborne vehicle such as the towed airborne vehicle 508 (task 602).

Process 600 may continue by pulling the towed airborne vehicle 508 by a tow cable such as the tow cable 506 coupled to the towing airborne vehicle 502 (task 604).

The process 600 may continue by actively maneuvering the towed airborne vehicle 508 comprising the sensor array 516 via a plurality of control surfaces such as the control surfaces 514 coupled thereto (task 606). The control surfaces 514 may comprise surfaces such an aerodynamic surfaces utilizing air in a case of aircraft. Alternatively, the control surfaces 514 may comprise surfaces such as fluid dynamic or hydrodynamic surfaces utilizing liquid (e.g., water) instead of air in a case of water craft.

Process 600 may continue by controlling the control surfaces 514 such that a desired path such as the desired path 112 is tracked based on and as a function of the desired tracking parameters (task 608).

Process 600 may continue by providing a stable lateral maneuverability via using direct lift and a side force from the control surfaces 514 (task 610).

Process 600 may continue by maintaining an orientation of the sensor array 516 and a constant altitude h 114 above the desired path 112 (task 612).

Process 600 may continue by receiving a sensed signal such as the sensed signals 132 from the desired path 112 at the sensor array 516 (task 614).

Process 600 may continue by sending the sensed signals 132 to a receiver at the towing airborne vehicle 502 (task 616).

Figure 7:
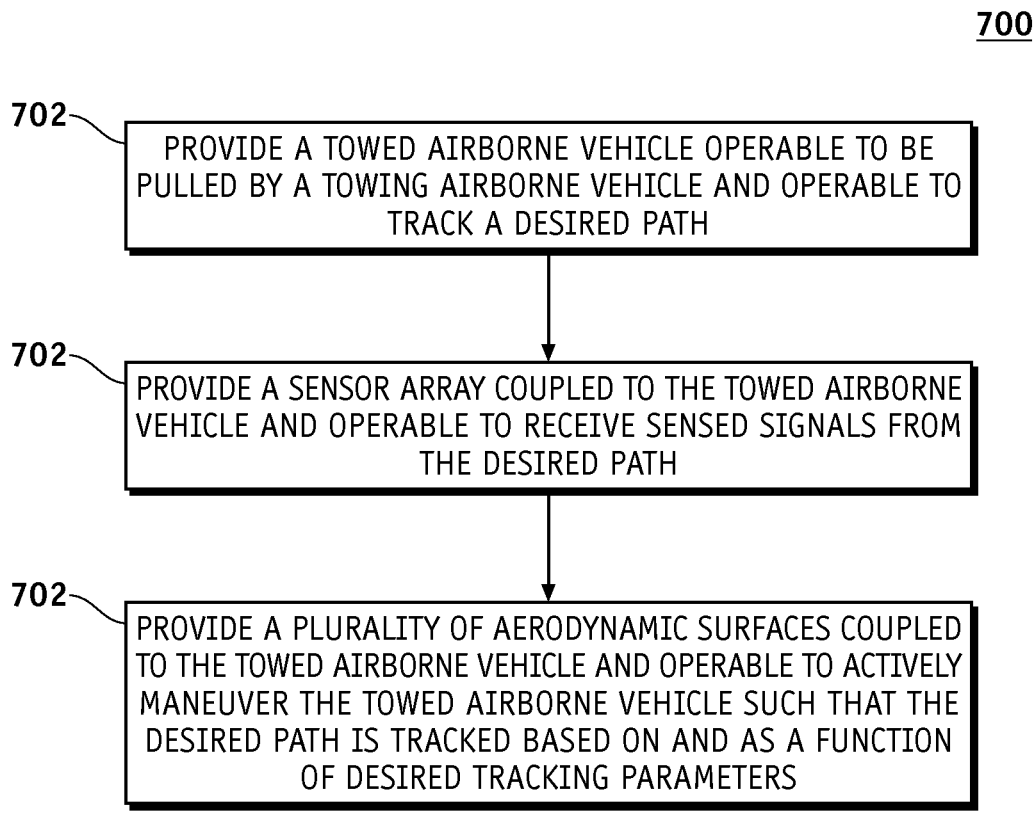
FIG. 7 is an illustration of an exemplary flowchart showing a process for providing a towed airborne vehicle according to an embodiment of the disclosure.
Figure 8:
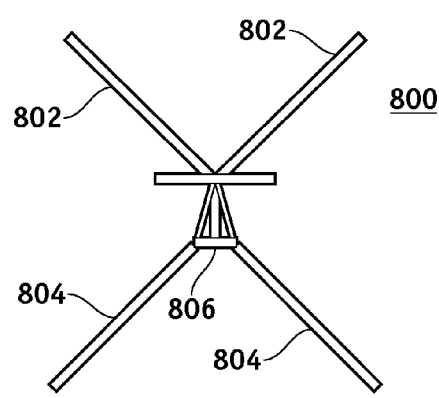
FIGS. 8-11 are illustrations of a front view, a left side view, a top view, and a perspective view of a towed airborne vehicle structure respectively showing an X-wing configuration according to an embodiment of the disclosure.
Figure 9:
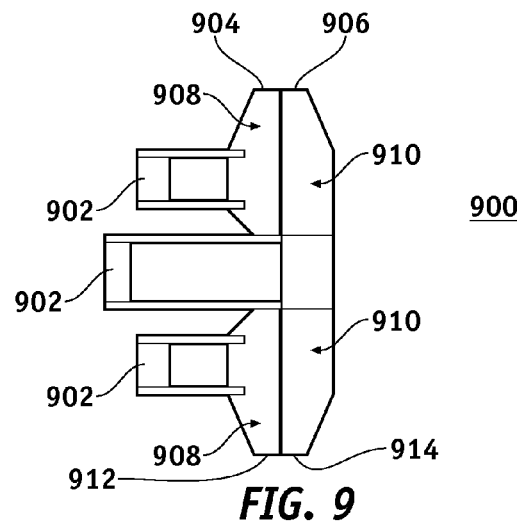
Figure 10:
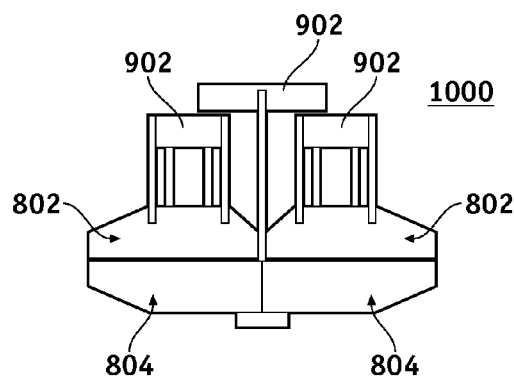
Figure 11:
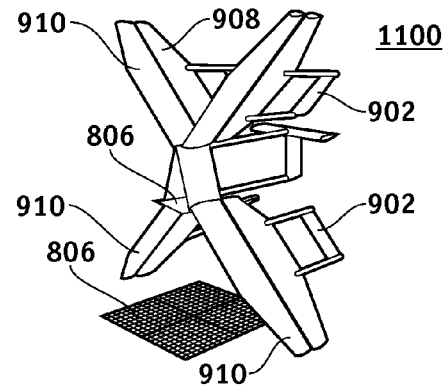

FIG. 7 is an illustration of an exemplary flowchart showing a process for providing the towed airborne vehicle 102/508 comprising the sensor array 104/516 according to an embodiment of the disclosure. The various tasks performed in connection with process 700 may be performed mechanically, by software, hardware, firmware, a computer-readable medium having computer executable instructions for performing the process method, or any combination thereof. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein.

For illustrative purposes, the following description of process 700 may refer to elements mentioned above in connection with FIG. 1-5. In practical embodiments, portions of the process 700 may be performed by different elements of the system 500 such as: the towing airborne vehicle 502, the tow cable 506, the towed airborne vehicle 508, etc. Process 700 may have functions, material, and structures that are similar to the embodiments shown in FIGS. 1-5. Therefore common features, functions, and elements may not be redundantly described here.

Process 700 may begin by providing a towed airborne vehicle such as the towed airborne vehicle 508 operable to be pulled by a towing airborne vehicle such as the towing airborne vehicle 502 and operable to track the desired path 112 (task 702).

Process 700 may continue by providing a sensor array such as the sensor array 516 coupled to the towed airborne vehicle 508 and operable to receive a sensed signal such as the sensed signals 132 from the desired path 112 (task 704).

Process 700 may continue by providing a plurality of surfaces 514 coupled to the towed airborne vehicle 508 and operable to actively maneuver the towed airborne vehicle 508 such that the desired path 112 is tracked based on and as a function of desired tracking parameters (task 706).

FIGS. 8-11 are illustrations of a front view 800, a left side view 900, a top view 1000, and a perspective view 1100 of a towed airborne vehicle structure respectively showing the X-wing configuration 202 (FIG. 2) according to an embodiment of the disclosure. The X-wing configuration 202 comprises the flying surfaces arranged in an X configuration. The X-wing configuration 202 comprises upper wing panels 802, and lower wing panels 804. The upper wing panels 802 and lower wing panels 804 each comprise two symmetrical panels such as a rear panel 908 and a forward panel 910 hinged together in tandem to form a wing with an about 50% chord flap. When deflected, the rear panel 908 forms a slotted flap.

A tail surface of the tail 902 attached to the rear panel 908 (flap) is controlled by one of the actuators 518 (actuator 518) to fly the rear panel 908 (flap) to a desired deflection. This reduces a size of the actuator 518 required, compared to rotating the entire upper wing panels 802/and the lower wing panels 804, and it allows the flap to weathervane on the ground to reduce the wind loads on the wing panels 802 by about 80%. The forward panel 910 of the lower wing panel 804 is hinged to the sensor array 806 along their roots and do not rotate about their axes.

Bracing wires connect the upper wing tips 904 and 906 of the rear panel 908 and the forward panel 910 respectively. Wires also connect the upper wing panels 802 to the bottom of the sensor array 806 to make the entire assembly of the X-wing configuration 202 rigid.

Wheels (not shown) on the lower wing tips 912 and 914 and tail caster allow the towed airborne vehicle 508 to be maneuvered on the ground while facing into the wind.

A "T" or cruciform tail such as the tail 902 extends aft from the sensor array 806 (104 in FIG. 1) to stabilize the towed airborne vehicle 508 in pitch and yaw. It may not be necessary to control the towed airborne vehicle 508 using the tail 902, but the tail 902 would provide additional degrees of freedom if pitch and yaw control is required. Direct lift, direct side force and roll control are provided by the upper wing panels 802 and the lower wing panels 804.

Figure 12:
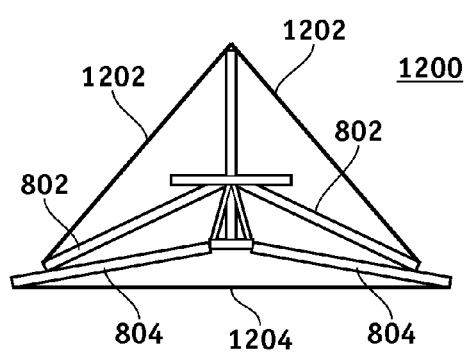
FIG. 12-13 are illustrations of an exemplary towed airborne vehicle structure in an X-wing configuration showing a means for assembling and erecting an X-wing assembly according to an embodiment of the disclosure.
Figure 13:
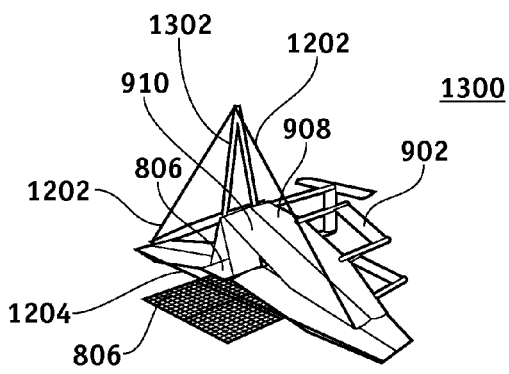
Figure 14:
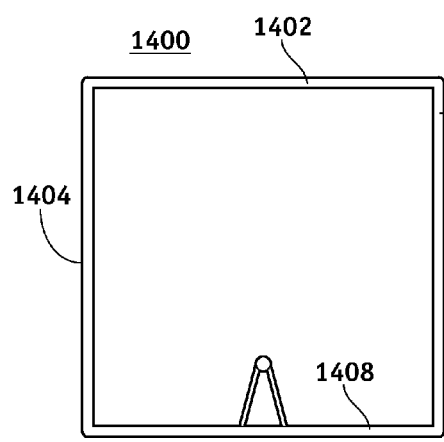
FIGS. 14-17 are illustrations of a front view, a left side view, a top view, and a perspective view of a towed airborne vehicle structure respectively showing a box-wing configuration according to an embodiment of the disclosure.
Figure 15:
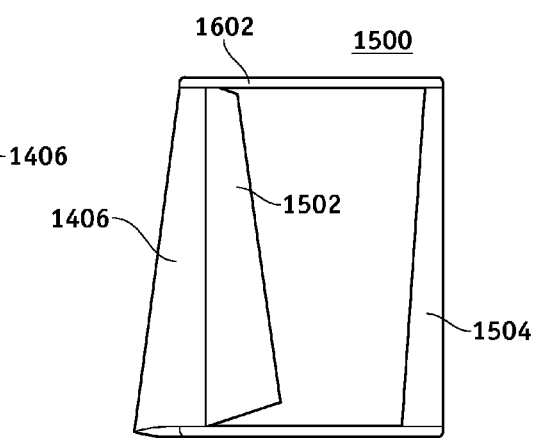
Figure 16:
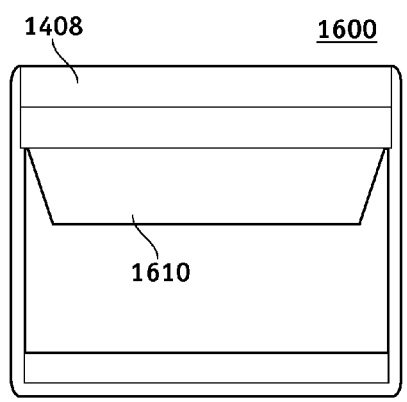

FIG. 12-13 are illustrations of the exemplary towed airborne vehicle structure in the X-wing configuration 202 showing a means for assembling and erecting an X-wing assembly according to an embodiment of the disclosure. The X-wing configuration 202 is assembled by attaching the upper wing panels 802 and the lower wing panels 804 to hinges (not shown) on the sensor array 806, with the sensor array 806 sitting on the ground, as shown in FIG. 13. Cables 1202 from the upper wing tips 904 and 906 run to a temporary "A" frame strut 1302 and winch attached to the sensor array 806 to lift the upper wing panels 802 and the lower wing panels 804 into position for the flying wires to be attached. Vertical flying wires are attached to the upper wing tips 904 and 906 (port and starboard wing tips), and left slack. The final erection is accomplished by winching the two lower wing tips 912 and 914 toward the center by a cable 1204 and attaching bottom flying wires.

FIGS. 14-17 are illustrations of a front view 1400, a left side view 1500, a top view 1600, and a perspective view 1700 of the towed airborne vehicle 508 structure respectively in the box-wing configuration 204 according to an embodiment of the disclosure. The box-wing configuration 204 comprises at least one flap 1502 comprising three or more segments, at least one tail 1610 used as an stabilizer (stabilizer 1610), fixed horizontal surfaces 1402/1408 coupled to the stabilizer 1610, and fixed vertical surfaces 1404/1406 coupled to the flap 1502. A sensor array 1702 (104 in FIG. 2) is mounted on the lower surface 1408, and surfaces of the sensor array 1702 are tapered to shift the centroid of the area downward to match the lowered center of gravity.

The box-wing configuration 204 is a most efficient aerodynamic configuration compared to the X-wing configuration 202 and the bi-plane configuration 206. The box-wing configuration 204 has an effective span greater than its physical span, allowing the size of the towed airborne vehicle 508 to be reduced somewhat, although the towed airborne vehicle 508 still needs to have the area required to achieve 2 gs.

The same 50% chord flap sections are used for the flying surfaces as the X-wing configuration 202, but the flaps 1502 are divided into three or more segments and actuated directly. The box-wing configuration 204 requires multiple flaps 1502 along the span to control roll moments. The tail 1610 can be a fixed stabilizer or actuated to control pitch and yaw.

The forward elements such as the fixed vertical surfaces 1404/1406 and the fixed horizontal surfaces 1402/1408 form a solid backup structure for the actuators 518. Diagonal wires (not shown) brace the box-wing configuration 204 against shear loads.

Figure 17:
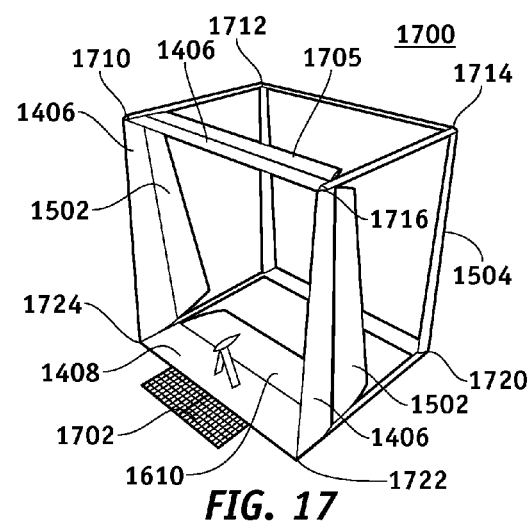
Figure 18:
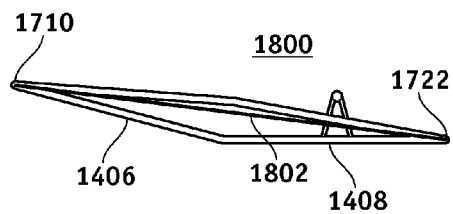
FIGS. 18-19 are illustrations of the exemplary towed airborne vehicle structure in a box-wing configuration showing a means for assembling and erecting a box-wing assembly according to an embodiment of the disclosure.
Figure 19:
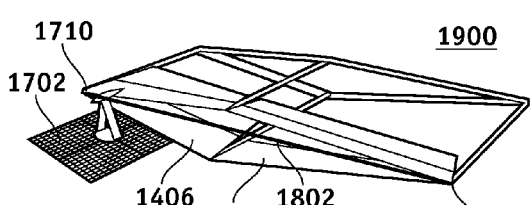
Figure 20:
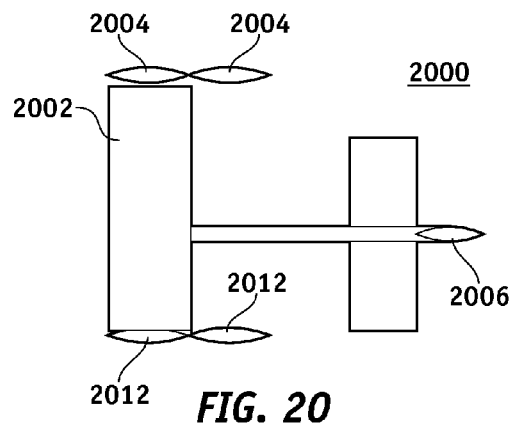
FIGS. 20-23 are illustrations of a front view, a left side view, a top view, and a perspective view of a towed airborne vehicle structure respectively showing a bi-plane configuration according to an embodiment of the disclosure.
Figure 21:
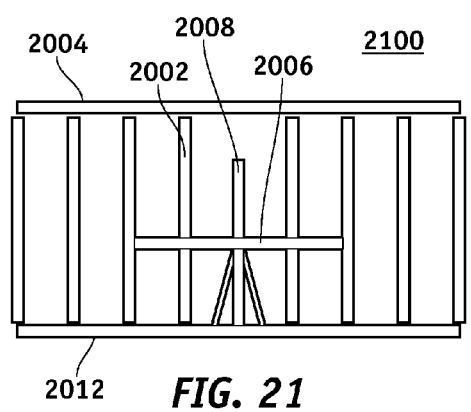
Figure 22:
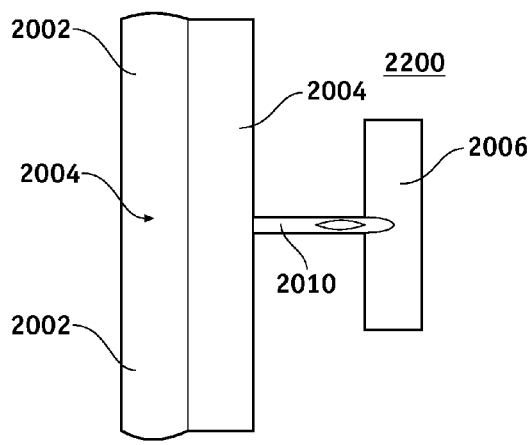
Figure 23:
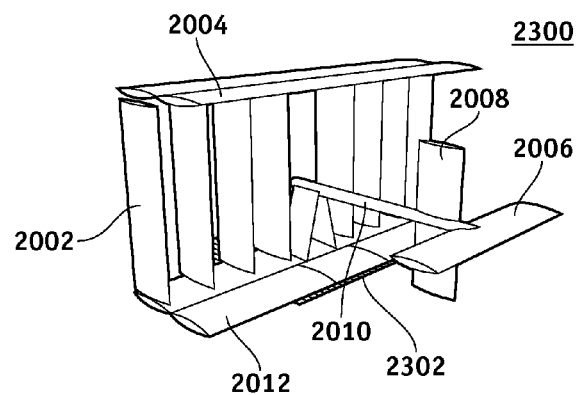
Figure 24:
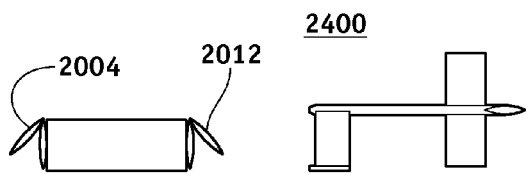
FIGS. 24-27 are illustrations of the exemplary towed airborne vehicle structure in a bi-plane configuration showing a means for assembling and erecting a bi-plane assembly according to an embodiment of the disclosure.
Figure 25:
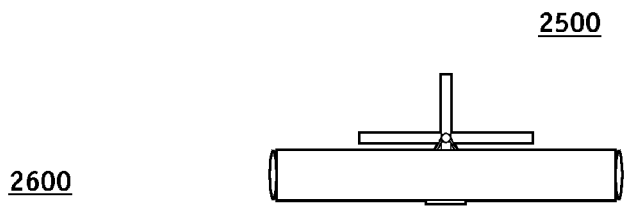
Figure 26:
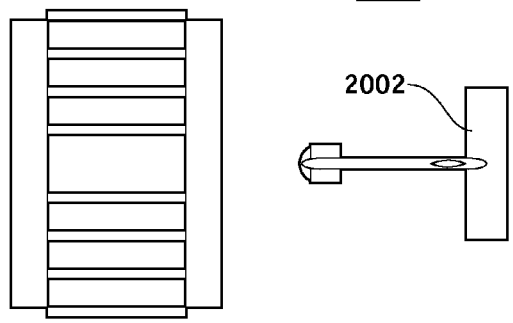
Figure 27:
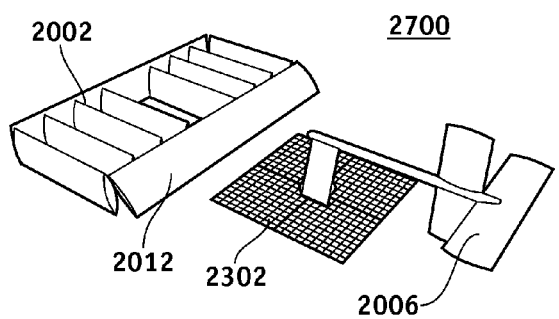

FIGS. 18-19 are illustrations of the exemplary towed airborne vehicle structure in the box-wing configuration 204 showing a means for assembling and erecting a box-wing assembly according to an embodiment of the disclosure. The fixed horizontal surface 1402/1408 (wing panels) are hinged at the ends, allowing them to be assembled flat on the ground without the sensor array 1702. Flying wires (not shown) across the short diagonal are attached and left slack. An erecting cable 1802 across the long diagonal is winched in to corners 1710 and 1722 to straighten and erect the box-wing configuration 204, and the shape is secured when remaining diagonal flying wires are attached. A slack cable (not shown) between other two diagonal corners 1716 and 1724 can be used to come tight and limit the movement when the box-wing configuration 204 is fully erected as shown in FIG. 17.

The slack cable and the erecting cable 1802 can be coupled to any two diagonal corners among the corners 1710-1724 that are other than the corners used for the erecting cable 1802. The slack cable and the erecting cable 1802 brace the towed airborne vehicle 508 diagonally in flight in both directions. The towed sensor array 1702 is then set in place on a lower wing such as the fixed horizontal surface 1408. Castering wheels (not shown) on the lower wing panel 1408 and tail booms (not shown) allow the box-wing configuration 204 to be maneuvered on the ground while facing into the wind.

FIGS. 20-23 are illustrations of a front view 2000, a left side view 2100, a top view 2200, and a perspective view 2300 of the towed airborne vehicle structure respectively showing the bi-plane configuration 206 (FIG. 2) according to an embodiment of the disclosure. The bi-plane configuration 206 reduces the physical height of the towed airborne vehicle 508 by using an array of vertical surfaces 2002 (vertical wing panels 2002) in a multi-plane configuration, end-plated by upper horizontal wings 2004 and lower horizontal wings 2012 in a biplane configuration.

The bi-plane configuration 206 configuration is more complex than the X-wing configuration 202, and the box-wing configuration 204 because the bi-plane configuration 206 requires bearings in the upper horizontal wings 2004 for rotating elements that can withstand the axial loads from the upper horizontal wings 2004 and the lower horizontal wings 2012 as well as the side loads from the rotating elements. The upper horizontal wings 2004 and the lower horizontal wings 2012 are wire braced like a biplane, and the tail boom 2006 wire braced as well, to minimize the load carried through the sensor array struts (not shown).

The landing gear (not shown) comprises a conventional crosswind gear with swiveling wheels, similar to, without limitation, the crosswind landing gear on a Cessna 195.

Unlike the X-wing configuration 202 and the box-wing configuration 204 that can be assembled in the open, facing the wind, and are largely self-jigging, the biplane configuration 206 would require jigs to assemble it, and may have to be assembled in a hangar. Its lower height would make it compatible with the height of a hangar door.

FIGS. 24-27 are illustrations of the exemplary towed airborne vehicle structure in the bi-plane configuration 206 showing a means for assembling and erecting a bi-plane assembly according to an embodiment of the disclosure. Assembly would begin by placing the upper horizontal wings 2004 and the vertical wing panels 2002 in a jig, leading edge down. The horizontal wings 2004 may be added, inserting the shafts from the vertical wing panels 2002 into the bearings in the upper horizontal wings 2004 and the lower horizontal wings 2012. The flaps to the upper horizontal wings 2004 would be attached and the actuators rigged. As with the box-wing configuration 204, multiple flaps are required across the span to form full span flaperons for roll control as well as direct lift. The landing gear (not shown) (with a temporary "wheelie" tail wheel caster attached to the main gear) would also be attached to the lower horizontal wings 2012. The tail boom 2006 and sensor array 2302 is assembled in a separate jig.

The upper horizontal wings 2004 and the lower horizontal wings 2012 are rotated from a leading-edge-down position to upright (stabilized by the wheelie), and the sensor array 2302/tail boom 2006 assembly attached and rigged, and the temporary wheelie removed.

The illustrated embodiments are examples, and those skilled in the art will appreciate that multiple control surface configurations can be used to provide the towed airborne vehicle 508. The towed airborne vehicle 508 may be transported by a large cargo plane.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-29 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A towed sensor array maneuvering system comprising:
    a towed airborne vehicle operable to be pulled by a towing airborne vehicle via a tow cable, and follow a path independently of the towing airborne vehicle;
    a controller coupled to the towed airborne vehicle and operable to actively control the towed airborne vehicle based on and as a function of sensed signals; and
    a sensor array coupled to the towed airborne vehicle and operable to receive sensed signals during flight, from a desired ground path to be followed by the towed airborne vehicle, the sensor array operably controlled by the controller so that the towed airborne vehicle actively tracks the desired ground path independent of a path of the towing airborne vehicle and is actively maneuvered in response to the sensed signals.

2. The system of claim 1, further comprising aerodynamic surfaces operable to provide an aerodynamic configuration such that the towed airborne vehicle is operable to aggressively maneuver while the towed airborne vehicle is being towed by the towing airborne vehicle.

3. The system of claim 2, wherein the aerodynamic surfaces are further operable to provide stable lateral maneuverability via using direct lift and a large side force generated therefrom so as to actively maintain an orientation of the sensor array and a substantially constant altitude above the desired ground path while tracking the desired ground path.

4. The system of claim 3, wherein the aerodynamic surfaces are sized to accommodate the large side force on the towed airborne vehicle, and the aerodynamic surfaces comprise at least one member selected from the group consisting of: vertical surfaces, and horizontal wings.

5. The system of claim 2, wherein the aerodynamic surfaces comprise upper wing panels and lower wing panels each comprising a rear panel and a forward panel hinged together in tandem to form a wing, and a tail surface attached to the rear panel.

6. The system of claim 2, wherein the aerodynamic surfaces comprise at least one flap comprising three or more segments, at least one stabilizer, at least one fixed horizontal surface coupled to at least one stabilizer, and at least one vertical surface coupled to the at least one flap.

7. The system of claim 2, wherein the aerodynamic surfaces comprise an array of vertical surfaces in a multi-plane configuration end-plated by horizontal wings in a biplane configuration, a tail boom, a tail coupled to the tail boom and one of the horizontal wings.

8. The system of claim 1, wherein the towed airborne vehicle comprises an X-wing configuration.

9. The system of claim 1, wherein the towed airborne vehicle comprises a box-wing configuration.

10. The system of claim 1, wherein the towed airborne vehicle comprises a biplane configuration.

11. The system of claim 1, wherein the tow cable is operable to be removably coupled to the towing airborne vehicle and operable to engage with a winch cable.

12. The system of claim 11, wherein the tow cable comprises at least one member selected from the group consisting of: an in-line load cell operable to detect a tension load on the tow cable, a power line operable to transmit power to the towed airborne vehicle, and a communication link operable to communicate data between the towed airborne vehicle and the towing airborne vehicle.

13. The system of claim 1, wherein the controller is further operable to actively control the towed airborne vehicle based on and as a function of desired tracking parameters.

14. The system of claim 1, wherein the towing airborne vehicle is an aircraft.

15. A method for maneuvering a sensor array on a towed airborne vehicle independently of a towing airborne vehicle, the method comprising:
sensing by a sensor array on a towed airborne vehicle during flight, sensed signals from a desired ground path via the sensor array so that the towed airborne vehicle actively tracks the desired ground path, wherein the desired ground path taken by the towed airborne vehicle is independent of a path taken by a towing aircraft;
actively maneuvering the towed airborne vehicle comprising the sensor array via a plurality of surfaces coupled thereto; and
controlling the surfaces based on the sensed signals such that the desired ground path is tracked by the towed airborne vehicle.

16. The method of claim 15, further comprising:
pulling the towed airborne vehicle by a tow cable coupled to the towing aircraft; and
providing a stable lateral maneuverability of the towed airborne vehicle via using a direct lift and a side force generated from the surfaces so as to maintain an orientation of the sensor array at a substantially constant altitude above the desired ground path.

17. The method of claim 15, wherein the desired ground path is tracked by the towed vehicle based on and as a function of desired tracking parameters comprising at least one member selected from the group consisting of: an orientation of the sensor array, an altitude of the sensor array above the desired ground path, a control authority, a control bandwidth, handling characteristics to allow proper tracking from a remote operator for mitigating a coupled dynamic interaction effect between the towed airborne vehicle and the towing airborne vehicle, a towed vehicle airspeed, a towed vehicle weight, a tow cable weight, an actuator rate, and a system latency.

18. The method of claim 15, wherein the towed airborne vehicle comprises at least one member selected from the group consisting of: an X-wing configuration, a box-wing configuration, and a bi-plane configuration.

19. A method for towing a towed airborne vehicle independently of a towing airborne vehicle, the method comprising:
pulling a towed sensor array maneuvering system by the towing airborne vehicle, the sensor array maneuvering system comprising:
the towed airborne vehicle operable to be pulled by the towing airborne vehicle via a tow cable, and follow a path independently of the towing airborne vehicle;
a controller coupled to the towed airborne vehicle and operable to actively control the towed airborne vehicle based on and as a function of sensed signals; and
a sensor array coupled to the towed airborne vehicle and operable to receive sensed signals during flight, from a desired ground path to be followed by the towed airborne vehicle, the sensor array operably controlled by the controller so that the towed airborne vehicle actively tracks the desired ground path independent of a path of the towing airborne vehicle and is actively maneuvered in response to the sensed signals.

20. The method of claim 19, wherein the towing airborne vehicle is an aircraft.

\* \* \* \* \*